(12) United States Patent
Chandrasekhar et al.

(10) Patent No.: US 9,942,901 B2
(45) Date of Patent: Apr. 10, 2018

(54) MINIMIZING INTERFERENCE IN WIRELESS COMMUNICATION

(71) Applicant: Cisco Technology, Inc., San Jose, CA (US)

(72) Inventors: Vikram Chandrasekhar, Mountain View, CA (US); James Seymour, North Aurora, IL (US); Rajesh Pazhyannur, Fremont, CA (US); Andrew Myles, Turramurra (AU)

(73) Assignee: Cisco Technology, Inc., San Jose, CA (US)

( * ) Notice: Subject to any disclaimer, the term of this patent is extended or adjusted under 35 U.S.C. 154(b) by 133 days.

(21) Appl. No.: 14/933,058

(22) Filed: Nov. 5, 2015

(65) Prior Publication Data
US 2016/0135189 A1    May 12, 2016

Related U.S. Application Data

(60) Provisional application No. 62/076,575, filed on Nov. 7, 2014.

(51) Int. Cl.
*H04W 72/04* (2009.01)
*H04L 5/00* (2006.01)
*H04W 16/14* (2009.01)

(52) U.S. Cl.
CPC ......... *H04W 72/0453* (2013.01); *H04L 5/005* (2013.01); *H04W 16/14* (2013.01)

(58) Field of Classification Search
CPC .... H04W 72/0453; H04W 16/14; H04L 5/005
See application file for complete search history.

(56) References Cited

U.S. PATENT DOCUMENTS 8,139,537 B2 * 3/2012 Marks ................. H04L 5/0007
                                                              370/280
2006/0223448 A1  10/2006 Kruys
2011/0205986 A1   8/2011 Medapalli
(Continued)

FOREIGN PATENT DOCUMENTS

EP    2963989 A1    1/2016

OTHER PUBLICATIONS

International Search Report and Written Opinion in counterpart International Application No. PCT/US2015/059133, dated Jan. 22, 2016, 11 pages.

(Continued)

*Primary Examiner* — Yemane Mesfin
*Assistant Examiner* — Henry Baron
(74) *Attorney, Agent, or Firm* — Edell, Shapiro & Finnan, LLC

(57) ABSTRACT

A method is provided for minimizing cross-technology interference with data transmissions from a wireless device in a shared spectrum. The wireless device obtains data to be wirelessly transmitted in a transmission burst in a first radio access technology (RAT) format over a shared spectrum. The wireless device generates a preamble comprising assistance information related to the transmission burst. The preamble comprises a first preamble portion in the first RAT format and a second preamble portion in a second RAT format. The wireless device transmits the preamble followed by the transmission burst.

21 Claims, 6 Drawing Sheets

(56) References Cited

U.S. PATENT DOCUMENTS

| | | | |
|---|---|---|---|
| 2013/0294356 A1* | 11/2013 | Bala | H04W 16/14 |
| | | | 370/329 |
| 2013/0315152 A1 | 11/2013 | Ratasuk et al. | |
| 2013/0343288 A1 | 12/2013 | Ratasuk et al. | |
| 2014/0036818 A1 | 2/2014 | Koskela et al. | |
| 2014/0112289 A1 | 4/2014 | Kim et al. | |
| 2014/0287769 A1 | 9/2014 | Taori et al. | |
| 2014/0341207 A1 | 11/2014 | Bhushan et al. | |
| 2015/0043523 A1 | 2/2015 | Luo et al. | |
| 2015/0063148 A1 | 3/2015 | Sadek | |
| 2015/0334744 A1* | 11/2015 | Ji | H04W 74/0816 |
| | | | 370/336 |
| 2015/0373582 A1* | 12/2015 | Valliappan | H04W 28/08 |
| | | | 370/329 |
| 2016/0135212 A1* | 5/2016 | Wong | H04W 16/14 |
| | | | 370/329 |
| 2016/0174079 A1* | 6/2016 | Wang | H04W 16/14 |
| | | | 455/454 |

OTHER PUBLICATIONS

A. Mukherjee et al., "System Architecture and Coexistence Evaluation of Licensed-Assisted Access LTE with IEEE 802.11", 6 pages.
"LTE for unlicensed spectrum", Nokia Networks, White Paper, networks.nokia.com, 12 pages.

\* cited by examiner

MINIMIZING INTERFERENCE IN WIRELESS COMMUNICATION

CROSS-REFERENCE TO RELATED APPLICATION

This application claims priority to U.S. Provisional Application No. 62/076,575, filed Nov. 7, 2014, the entirety of which is incorporated herein by reference.

TECHNICAL FIELD

The present disclosure relates to wireless networks.

BACKGROUND

Release-13 LTE deployments in unlicensed spectrum will be licensed assisted (also called Licensed Assisted Access-Long Term Evolution or LAA-LTE), which implies that transmission over unlicensed secondary carriers will be anchored to a primary licensed carrier using Release-12 Carrier Aggregation principles. Unlike an IEEE 802.11 wireless local area network (i.e., Wi-Fi® network) in which devices first monitor the medium to detect energy prior to transmission via a Clear Channel Assessment (CCA) procedure, the current Long Term Evolution (LAA-LTE) wireless communication standard does not require an LAA-LTE transmitter to first monitor the medium for energy prior to transmission.

In unlicensed/shared spectrum, particularly in densely deployed scenarios, LAA-LTE Access Point/User Equipment (AP/UE) devices potentially experience interference from other radio access technologies in the same frequency channel (e.g. Wi-Fi, Bluetooth® etc.). Inter-operator interference becomes an issue since an AP and UE belonging to different operators can transmit/receive in the same frequency channels.

Due to lack of Listen-before-Talk (LBT) capability in LAA-LTE, LAA-LTE transmissions from one operator can create high interference levels for LAA-LTE devices belonging to a different operator. LAA-LTE transmissions can also create high levels of interference to Wi-Fi stations (STAs) in the same frequency channels.

Therefore, in the unlicensed spectrum the end-to-end LAA-LTE performance can be significantly impacted by interference from neighbor Wi-Fi devices and LAA-LTE devices from a different operator. This can lead to potential hidden node scenarios where transmissions from the intended LAA-LTE transmitting device and from a neighbor Wi-Fi/LAA-LTE device can collide at an LAA-LTE receiver at almost equal power causing degraded Signal-to-Noise Plus Interference-Ratio (SINR) and possibly failed reception.

DESCRIPTION OF EXAMPLE EMBODIMENTS

Overview

Figure 1:
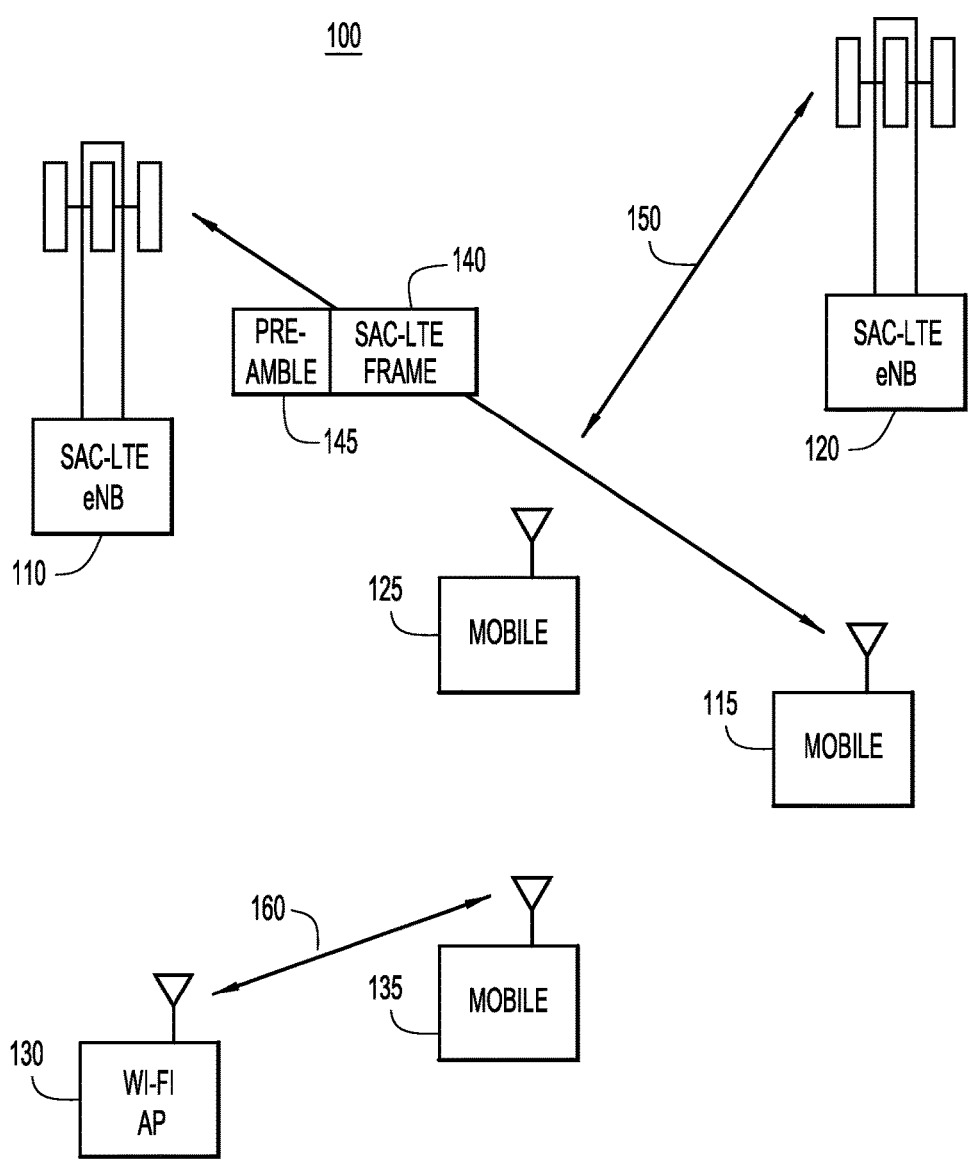
FIG. 1 is a simplified block diagram showing a deployment scenario in which the techniques presented herein may be used, according to an example embodiment.

A method is provided for minimizing cross-technology interference in a shared spectrum. The method comprises, at a wireless device belonging to a certain Radio Access Technology (RAT), obtaining data to be wirelessly transmitted in a transmission burst opportunity (TXOP) in a first RAT format over a shared spectrum. The wireless device generates a preamble comprising assistance information to alert potential transmitters in same spectrum, which may belong to the same RAT or different RAT, of its intent to occupy its medium via an impending wireless transmission. The preamble comprises a first preamble portion in the first RAT format and a second preamble portion in a second RAT format. The wireless device transmits the preamble followed by the transmission burst.

Detailed Description

Presented herein are methods to facilitate Listen-before-Talk (LBT) schemes for LAA-LTE via a Clear Channel Assessment (CCA) mechanism which is used to detect whether or not the wireless medium is busy or not prior to an impending LAA-LTE transmission. Further, the techniques presented herein may be applied to any wireless device using LTE-like transmissions in a shared/unlicensed spectrum (e.g., LTE-U, LAA, etc.), which may be referred to hereinafter as Shared Access LTE (SAC-LTE) transmissions. Two methods for CCA are disclosed. The first method relies on a SAC-LTE transmitter measuring the average energy received over a certain time interval and declaring that the medium is idle or busy, for purposes of LBT, based on a determination of whether the received energy over that interval is below or above an energy detection threshold. The second method relies on a SAC-LTE transmitter, prior to its transmission, attempting to detect preambles transmitted from other SAC-LTE and Wi-Fi devices, and declaring for purposes of LBT, that the medium is busy upon successful decoding of a wireless preamble.

A format for a wireless preamble signal transmitted from a SAC-LTE device is disclosed. The intent of the wireless preamble signal is that when a co-channel SAC-LTE or Wi-Fi device is able to successfully decode a preamble transmitted from a first SAC-LTE device, that co-channel SAC-LTE or Wi-Fi device can declare the channel busy, for purposes of LBT, and refrain from transmitting at least for the duration of the transmission of the first SAC-LTE device. Such a preamble comprises assistance information for neighbor UE/access points (e.g., SAC-LTE or Wi-Fi) to detect the duration of the SAC-LTE transmission and its transmission characteristics. Modifications of the SAC-LTE Physical Layer are also presented to ensure Listen-Before-Talk (LBT)-like medium access.

A SAC-LTE subframe structure consists of two slots, each of 0.5 ms duration. Each slot comprises either 6 or 7 Orthogonal Frequency Division Multiplex (OFDM) symbols depending on whether an extended or a normal cyclic prefix is used. The resources for each UE on a given subframe for downlink transmission and uplink transmission are conveyed through a downlink scheduling grant signalled via the Physical Downlink Control Channel (PDCCH), which can occupy between 1-3 symbols for system bandwidths greater than 10 resource blocks, each resource block occupying 180 KHz in the frequency domain.

Given a grant size equalling $N_{RB}$, the transmitted signal in each slot for that UE occupies $N_{SC,RB} \times N_{RB}$ subcarriers in the frequency domain, and assuming a sub-carrier spacing of 15 KHz, then $N_{SC,RB}=12$. The SAC-LTE downlink is self-scheduled, i.e., the downlink data is sent in the same subframe as the downlink grant. For SAC-LTE-Frequency Division Duplex (SAC-LTE-FDD), the uplink has 4 millisecond (ms) latency between time of uplink grant reception and time of uplink data transmission from the UE. For SAC-LTE-Time Division Duplex (SAC-LTE-TDD), the latency between time of uplink grant reception and time of uplink data transmission is dependent on the TDD configuration.

The end-to-end SAC-LTE performance when transmitting over unlicensed spectrum is affected by interference from neighbor Wi-Fi devices in the same frequency channel and SAC-LTE devices from a different operator. This is because the SAC-LTE device does not monitor the medium for energy prior to sending a transmission (e.g. via Clear Channel Assessment (CCA) either via preamble detection or via energy detection). This leads to a potential hidden node scenario where one a transmission from a SAC-LTE device and a transmission from a neighbor Wi-Fi/SAC-LTE device can arrive at a SAC-LTE receiver at almost equal power, causing failed reception.

In unlicensed spectrum, particularly in dense deployments, SAC-LTE AP/UE devices potentially experience interference from other radio access technologies in the same frequency channel (e.g. Wi-Fi, Bluetooth etc.). Inter-operator interference becomes an issue since an AP and a UE belonging to different operators can transmit/receive in the same frequency channels.

Due to lack of Listen-before-Talk (LBT) capability in SAC-LTE, SAC-LTE transmissions from one operator can create high interference levels for SAC-LTE devices belonging to a different operator. SAC-LTE transmissions can create (experience) high levels of interference to (from) Wi-Fi stations (STAs) in the same frequency channels.

Referring now to FIG. 1, a system 100 is shown as an example scenario for which the methods presented herein may be used. System 100 includes a wireless transmitter such as a SAC-LTE evolved node B (eNB) 110 that communicates wirelessly with a mobile device (e.g., a SAC-LTE UE) 115 at least partially over an unlicensed spectrum that may be shared with other wireless transmissions. For example, an unlicensed frequency band, such as the 5 GHz frequency band in the United States may be shared with Wi-Fi transmissions. The communication over the unlicensed/shared spectrum may be coordinated with communication over a licensed spectrum using, for example, a License Assisted Access (LAA) system. A second SAC-LTE eNB 120 communicates with a second mobile device 125 (e.g., another SAC-LTE UE) over the same unlicensed spectrum as used by the SAC-LTE eNB 110. In one example, the second SAC-LTE eNB 120 may use the same licensed spectrum or a different licensed spectrum as the first SAC-LTE eNB 110. Additionally, a Wi-Fi access point 130 communicates with a mobile device 135 (e.g., a Wi-Fi station) using the same shared spectrum as used by the SAC-LTE eNBs 110 and 120.

In one example, the SAC-LTE eNB 110 transmits data in a SAC-LTE transmission burst 140 preceded by a preamble 145. The preamble 145 may include a portion that is formatted according to a SAC-LTE standard and a portion that is formatted according to a Wi-Fi standard. The preamble 145 provides information to the SAC-LTE eNB 120 and the Wi-Fi access point 130 to prevent SAC-LTE transmission burst 140 from interfering with SAC-LTE transmissions 150 and/or Wi-Fi transmissions 160. In one example, the preamble includes or indicates a duration of the SAC-LTE transmission burst 140, so that SAC-LTE eNB 120 and Wi-Fi access point 130 will wait until the transmission of SAC-LTE transmission burst 140 is completed before attempting to transmit anything on the shared spectrum.

Figure 2:
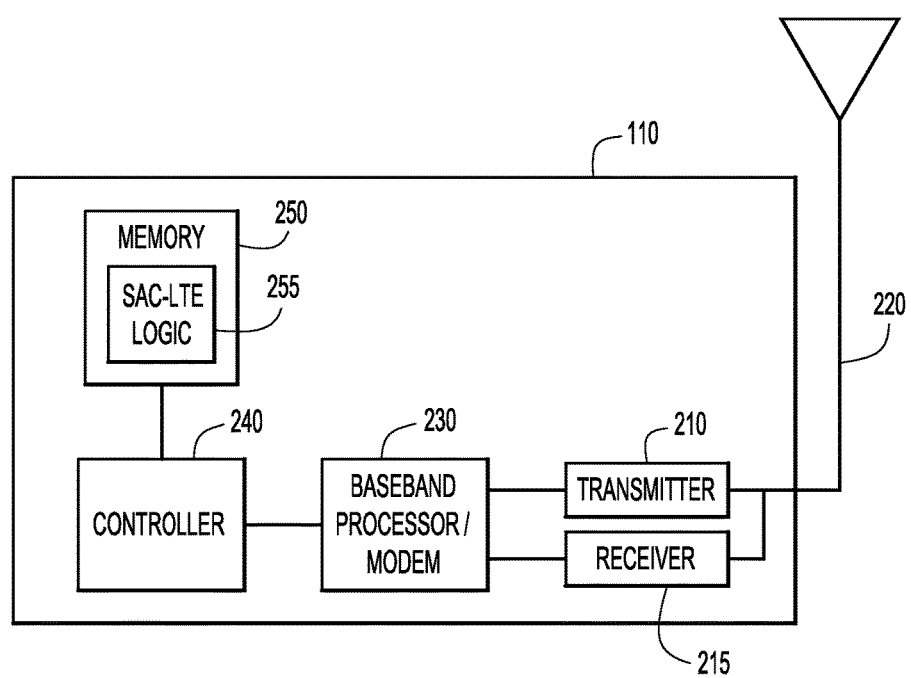
FIG. 2 illustrates a block diagram of a SAC-LTE device that may be configured to perform the methods presented herein, according to an example embodiment.

Referring now to FIG. 2, a simplified block diagram illustrates a wireless device, e.g., SAC-LTE eNB 110, configured to perform the methods presented herein. The SAC-LTE eNB 110 is shown as an example of a wireless device, but other wireless devices (e.g., UE 115) may include similar components that perform similar methods. The wireless device 110 includes a transmitter 210 (or multiple transmitters), a receiver 215 (or multiple receivers), an antenna 220, a baseband processor 230 (e.g., a modem), and a controller 240 (e.g., a processor such as a microprocessor or microcontroller). The baseband processor 230 may perform media access control (MAC) functions as well as physical layer (PHY) functions. The methods presented herein may be implemented by control logic in the baseband processor 230. The control logic may take the form of fixed or programmable digital logic gates. In another form, the control logic may be implemented by instructions stored/encoded in memory 250 (e.g., SAC-LTE logic 255) and executed by the controller 240. Additionally, the wireless device 110 may include a wired network interface unit (not shown) to communicate with other computing devices over a wired network.

The memory 250 may include read only memory (ROM), random access memory (RAM), magnetic disk storage media devices, optical storage media devices, flash memory devices, electrical, optical, or other physical/tangible memory storage devices. Thus, in general, the memory 250 may comprise one or more tangible (non-transitory) computer readable storage media (e.g., a memory device) encoded with software comprising computer executable instructions and when the software is executed (by the controller 240) it is operable to perform the operations described herein.

Figure 3:
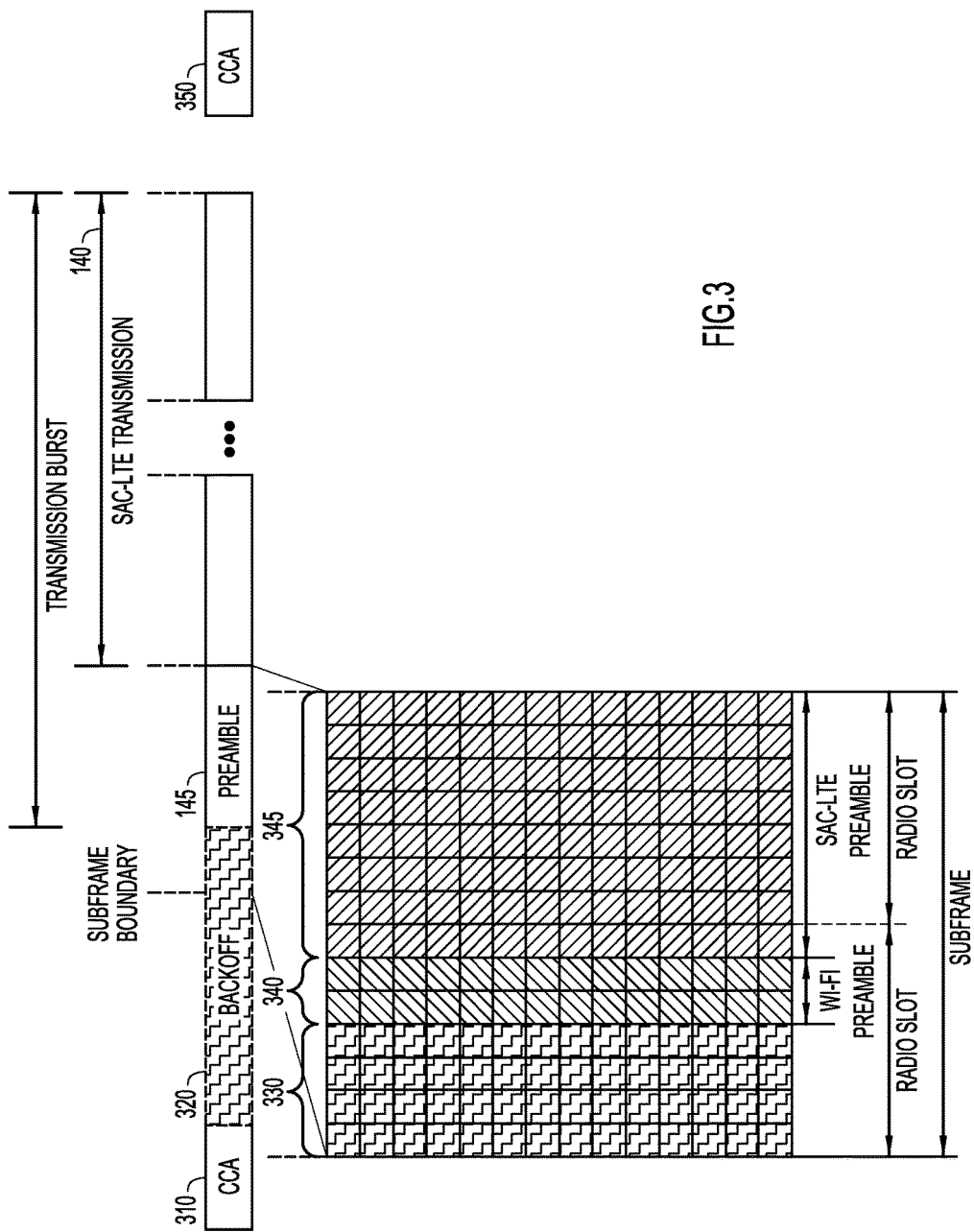
FIG. 3 illustrates a SAC-LTE preamble transmission structure according to an example embodiment.

Referring now to FIG. 3, a block diagram of a preamble structure within a CCA-backoff mechanism used by a wireless device, e.g., SAC-LTE eNB 110, is shown. Reference is also made to FIG. 1 for purposes of the description of FIG. 3. After a CCA process 310 determines that the shared medium is available, the SAC-LTE eNB 110 backs off from transmitting for a backoff period 320. The backoff period 320 ensures fair access to other transmitters (e.g., SAC-LTE eNB 120, Wi-Fi access point 130, mobile device 115, etc.) which would also back off for a randomly determined amount of time. The backoff procedure is described in more detail hereinafter in connection with FIGS. 4A and 4B.

After the appropriate backoff period 320, the SAC-LTE eNB 110 transmits the preamble 145 followed by the data transmission 140. The preamble 145 is transmitted until the subframe boundary immediately preceding the data transmission 140, and may not occupy an entire subframe. The subframe that includes the preamble 145 may be padded with a blank portion 330. The preamble 145 includes a first portion 340 and a second portion 345, which are formatted according to different standards, e.g., Wi-Fi and SAC-LTE, to provide assistance information to devices across different technologies. Another CCA process 350 may be implemented after a predetermined interval of time to determine if the medium is available for an additional data transmission.

In one example, a SAC-LTE transmitter (e.g., SAC-LTE eNB 110) with data to send (i.e. media access control-protocol data unit (MAC-PDU) has been assembled), will upon detection that the shared medium is idle, transmit one or more symbols conveying a preamble signal. The preamble signals are transmitted until the nearest subframe boundary occurs, after which the SAC-LTE transmitter starts transmitting data per its configured uplink/downlink (UL/DL) transmission mode.

The preamble symbols may be encoded to include two sets of signals. One set may comprise one or more 802.11n/802.11.ac preamble+ PLCP header. The other set may comprise one or more SAC-LTE OFDM symbols encoding a preamble reference sequence. The preamble signal may be transmitted at both an SAC-LTE eNodeB (eNB) Frequency Division Duplex-Downlink (FDD-DL) or configured Time-Division Duplex (TDD) downlink subframes and a SAC-LTE UE on FDD-UL or configured TDD uplink subframes.

In another example, a SAC-LTE device (e.g., eNB 110 or UE 115) reserves the medium prior to transmitting data and provides assistance information so as to alert one or more SAC-LTE and Wi-Fi devices regarding the SAC-LTE device's intent to transmit data and reserve the medium for channel access. The assistance information may comprise a set of OFDM symbols (e.g., Wi-Fi portion 340) encoded as per the IEEE 802.11n/ac preamble and a PLCP header which may be used to alert neighboring Wi-Fi devices (e.g., access point 130 or mobile device 135) regarding the start of transmission 140 and its duration.

The assistance information may also include a set of SAC-LTE OFDM symbols (e.g., SAC-LTE portion 345) using the SAC-LTE sub-carrier spacing, which may be used to alert neighbor SAC-LTE devices (e.g., eNB 120, mobile device 115 or mobile device 125) that it has reserved the medium for an impending transmission 140. The SAC-LTE OFDM symbols may encode the identity of the SAC-LTE transmitter, e.g., eNB Physical Layer Cell ID (PCID) or UE Cell Radio Network Traffic Identifier (C-RNTI). The SAC-LTE OFDM symbols in the preamble may also encode the duration of the data transmission 140, e.g., in units of OFDM symbols or subframes. Neighboring SAC-LTE devices may use this information to infer how long the SAC-LTE transmission 140 will occupy the shared medium. The duration field may be though of providing a virtual carrier sensing mechanism, i.e., upon decoding the duration field, other SAC-LTE nodes may defer transmission and not perform CCA for the duration of the transmission 140.

The assistance information provided via the preamble signaled by the SAC-LTE eNB 110 minimizes collisions between SAC-LTE and Wi-Fi transmitters and hence significantly reduces hidden node occurrences (since a Wi-Fi device will defer its potential transmission upon detecting the SAC-LTE preamble).

In a further example, the preamble 145 may be helpful in an inter-operator scenario where access points belonging to different operators are unsynchronized and uncoordinated and their deployments may not be planned. Referring back to FIG. 1 but with continued reference to FIG. 3, whenever eNB 110 and eNB 120 transmit simultaneously, the transmission 140 to mobile device 115 (connected to SAC-LTE eNB 110 of one operator) may be interfered with by transmission 150 from SAC-LTE eNB 120, which is run by a different operator. A time-division multiplex (TDM)-like behavior between eNB 110 and eNB 120 would allow sharing the medium so that when eNB 110 transmits to mobile device 115, eNB 120 does not transmit.

The preamble 145 transmitted by the eNB 110 may inform eNB 120 how long (e.g., how many subframes) transmission 140 will last, thereby providing eNB 120 the assistance information required to turn off or disable a transmission. This essentially enforces a TDM behavior between eNB 110 and eNB 120.

In yet another example, a preamble sequence generation technique may be used to create the preamble 145. In one method, the preamble sequence may comprise two parts. The first part may be generated according to a frequency-domain Zadoff-Chu sequence such that the root sequence index is a function of the cell ID group to which the eNB belongs. The second part may comprise a bit sequence that is generated in a way that the cell ID within that group is used to derive either the sequence offset or the seed for that bit sequence.

The preamble sequence 145 may be a sequence of either bits or complex exponential numbers, such that the preamble sequence 145 in a given OFDM symbol is passed through a known function to generate the preamble sequence for the next OFDM symbol. The known function should be one-to-one, but there is no restriction that the known function is linear.

The preamble sequence bits may take many forms, such as scrambled with a cell-specific sequence. The scrambled preamble sequence may be channel encoded per a tail-biting convolutional code whose output is Quadrature Phase Shift Keying (QPSK) modulated.

The preamble signal 145 may be transmitted in the center six resource blocks. Alternatively, the preamble signal 145 may be transmitted on one or more OFDM symbols across a 20 MHz bandwidth.

In another form, the preamble signal 145 may be transmitted on a known set of resource blocks and frequency hopping may be applied during preamble transmissions between one OFDM symbol to the next symbol. In this method, the frequency hopping pattern is communicated to the UE via Radio Resource Control (RRC) signaling on the primary (licensed) carrier.

In one example of the CCA process 310, a SAC-LTE transmitter, e.g., SAC-LTE eNB 110, with data ready to send, i.e., a MAC-PDU is assembled, monitors the medium to detect ongoing transmissions before sending the data. Initially, any energy detected above a predetermined threshold may cause the transmitter to defer transmission. This step is called energy detection. After the energy detection, the transmitter may perform a preamble detection step to detect one or more signatures from other SAC-LTE transmitters, e.g., SAC-LTE eNB 120. The preamble detection may be performed by auto-correlation of a given time-domain waveform with shifted copies of that waveform. Alternatively, the preamble may be detected by cross-correlation of the time-domain waveform against a known preamble sequence.

In still another example, the potential SAC-LTE transmitter (e.g., SAC-LTE eNB 110), during the CCA procedure 310, may decode a reference signal, such as the Primary Synchronization Signal (PSS) or the Secondary Synchronization Signal (SSS), to infer the Physical Layer Cell Identifier (PCID) of one or more neighboring SAC-LTE transmitters. The potential SAC-LTE transmitter may decode the reference signal following energy detection and prior to preamble detection. The PCID of the ongoing SAC-LTE transmission may be used as a reference to perform channel estimation over a set of pilot signals, e.g., cell-specific reference signal, CSI-reference signal, or Discovery reference signal, prior to decoding the preamble signals.

The SAC-LTE eNB 110 may configure the energy detection threshold at mobile device 115 via RRC-signaling on its primary licensed carrier. Furthermore, the SAC-LTE eNB 110 may configure (via RRC signaling on a licensed carrier) the CCA parameters of the mobile device 115, the minimum interval (e.g., a number of subframes) between the CCA procedure 310 prior to the transmission burst 140 (e.g., one or more consecutive SAC-LTE subframes) and the CCA procedure 350 following the transmission burst 140.

In yet another example, the SAC-LTE eNB 110 may communicate to mobile device 115, via RRC-signaling in a primary licensed carrier, assistance information for preamble detection. The assistance information may comprise the length of the preamble sequence, which may be chosen to be a prime number. The assistance information may also comprise one or more preamble initialization values (one per preamble) used to generate the preamble sequence. In one example, the preamble initialization value may be a root sequence index in the case of a Zadoff-Chu sequence.

Figure 4:
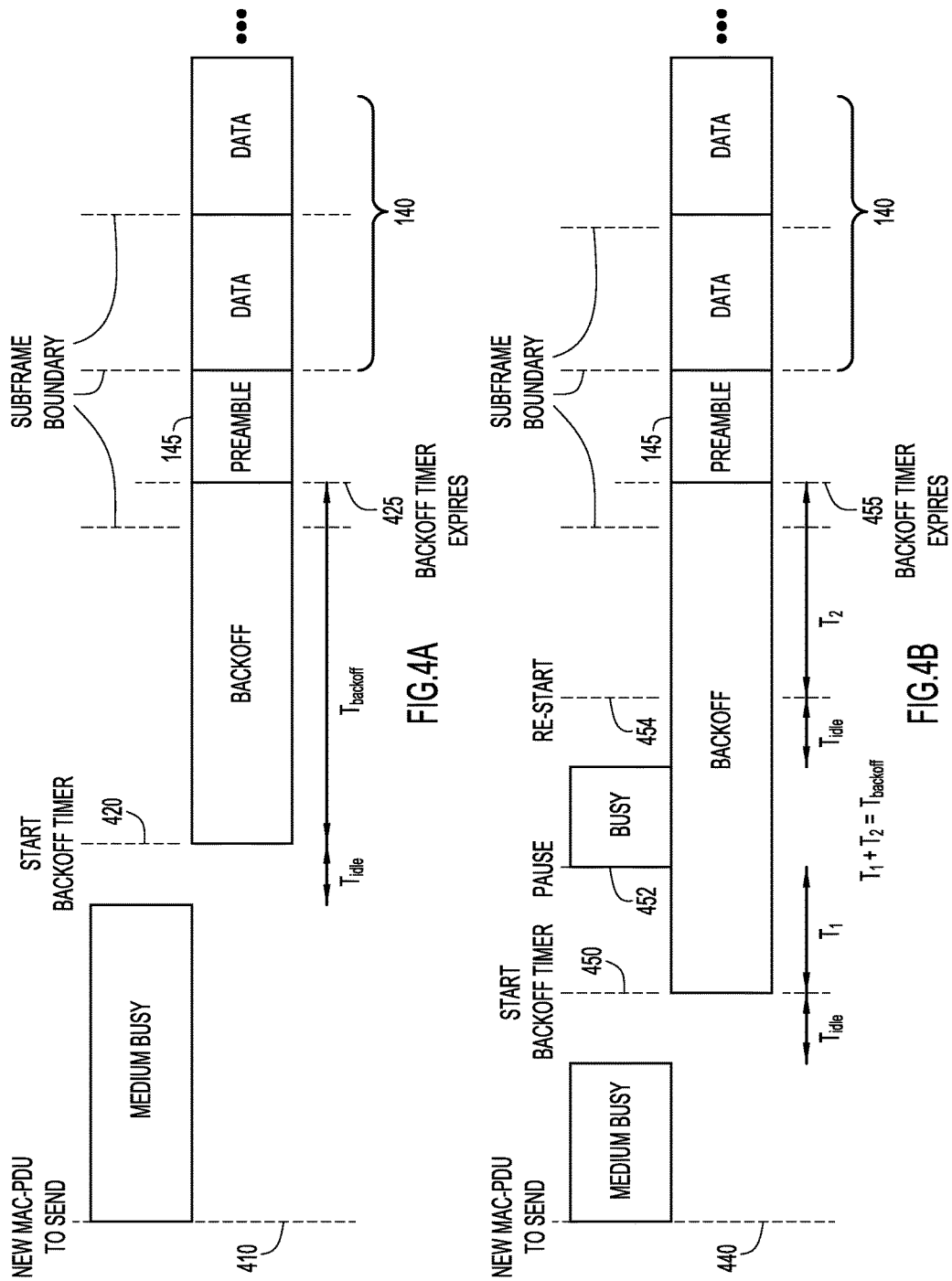
FIGS. 4A and 4B illustrate a backoff mechanism for use in a SAC-LTE device, according to an example embodiment.

Referring now to FIG. 4A, an example of a CCA backoff mechanism is shown. A SAC-LTE transmitter (e.g., SAC-LTE eNB 110) obtains data to be transmitted at time 410. The SAC-LTE transmitter would start transmitting if a time of $T_{idle}$ has elapsed since its last transmission, no backoff timer is running and the shared medium has been detected idle in this $T_{idle}$ time. However, if the SAC-LTE transmitter detects the medium is busy at time 410, the SAC-LTE transmitter defers transmission until the medium is detected idle, e.g., any energy detected is below a predetermined threshold and no preamble has been decoded from other SAC-LTE/Wi-Fi transmitters. Upon detecting the medium as idle for a time equaling $T_{idle}$ at time 420, the SAC-LTE transmitter starts a backoff timer of a randomly determined duration.

In one example, the duration of the backoff timer equals the length of one OFDM symbol multiplied by a random number drawn uniformly within the interval [0,CW], where CW equals $2^N-1$, $4 \le N \le 10$. The value of N may be initialized at 4. If the medium is detected idle, the backoff timer is decremented until the timer expires. During the next backoff period, the value of N is incremented by one.

After the timer expires at time 425, and the medium remains idle for a time T the SAC-LTE transmitter commences transmission. The start of the transmission may be accompanied by the preamble 145. The preamble 145 comprises at least one OFDM symbol to include the assistance information. The preamble symbols may be used as a way of reserving the medium for this SAC-LTE transmitter and notifying other potential SAC-LTE and/or Wi-Fi transmitters of this medium reservation. The number of preamble symbols to transmit may be determined by the interval between sensing the medium is idle and the start of the next subframe boundary.

Referring now to FIG. 4B, another example of a CCA backoff procedure is shown. A SAC-LTE transmitter obtains data to be wirelessly transmitted, e.g., a MAC-PDU is assembled, at time 440. The SAC-LTE transmitter detects that the shared medium is busy and defers transmission of the data until the medium is idle. After the medium is idle for a predetermined amount of time, e.g., $T_{idles}$, the SAC-LTE transmitter starts a backoff timer at time 450. At time 452, the SAC-LTE transmitter detects that the shared medium is busy again and pauses the backoff timer. Once the medium is idle again for a predetermined amount of time, e.g., $T_{idle}$, the SAC-LTE transmitter restarts the backoff timer at time 454. The backoff timer may be restarted at its previous value. After the backoff timer expires at time 455, the SAC-LTE transmitter may start transmitting the preamble 145 and the data transmission 140.

Figure 5:
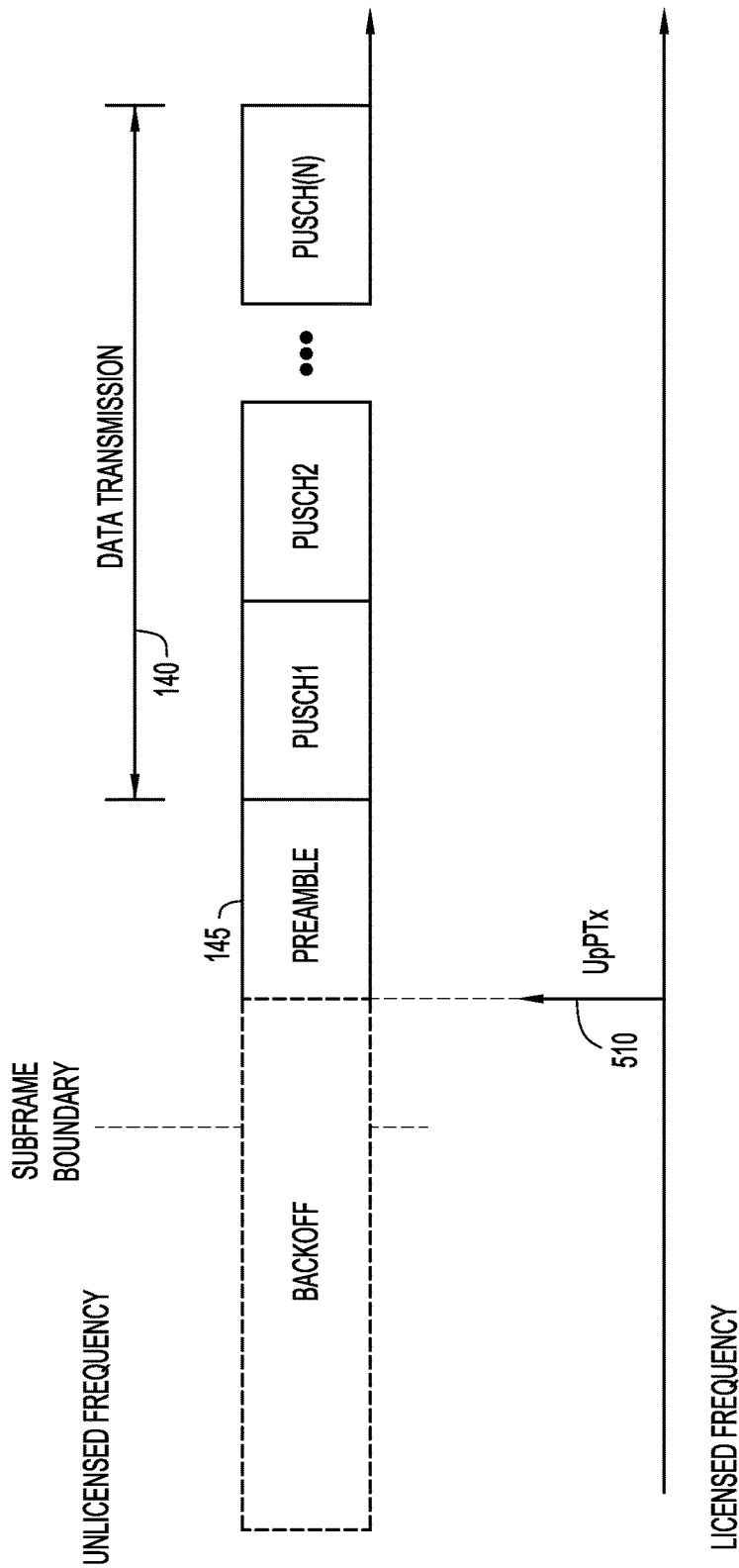
FIG. 5 illustrates techniques for an uplink control signal on a licensed frequency according to an example embodiment.

Referring now to FIG. 5, an example of uplink control signaling for data transmission is shown. Reference is also made to FIG. 1 for purposes of understanding FIG. 5. A method is presented by which a UE (with data to send) can convey to its eNodeB, information pertaining to an uplink transmission after detection that the medium is idle following an LBT event. A SAC-LTE UE (e.g., mobile device 115) determines that the shared medium is idle, and transmits a signal 510 (Uplink Preparing to Transmit or UpPTx) to convey that it has data to transmit to the eNB 110. The UpPTx signal 510 is transmitted on a licensed uplink carrier. The mobile device 115 uses the UpPTx signal 510 to convey to it serving eNB 110 that the mobile device 115 has determined, following a CCA procedure, that the medium is idle and is preparing to transmit on its scheduled frequency resources. The mobile device 115 should have received an uplink scheduling grant to transmit the data transmission.

In one example, the UpPTx signal 510 may also convey the number of preamble symbols in the preamble 145 until the start of the data transmission 140. The UpPTx signal 510 may also include at least one uplink Hybrid Automatic Repeat Request (HARQ) sequence number and additional information conveying the linkage to the uplink scheduling grant corresponding to the transmissions on each uplink subframe (e.g., Physical Uplink Shared Channel (PUSCH)). Additionally, the UpPTx signal 510 may include a starting and ending OFDM symbol index for the transmission of the preamble 145.

In another example, there may be a bound/limit on the maximum transmission duration imposed by the eNB 110. Considering a downlink-only case (SDL), the control information (e.g., which frequencies the mobile device 115 is using to receive its data) may be sent to the mobile device 115 on each subframe it is scheduled via the licensed carrier. On the SAC-LTE downlink, the subframe on which the mobile device 115 receives the control information may also be the subframe on which the data transmission occurs, i.e., there is no latency between the control grant and the data.

From the perspective of the eNB 110, the eNB 110 would transmit over a certain duration that is bounded according to the maximum transmission burst duration (e.g., determined by region specific regulations). For example, in Japan the maximum burst duration would be 4 milliseconds.

In still another example, if the eNB 110 has data to send, it would perform CCA based on an exponential back-off mechanism similar to Wi-Fi. Each UE is configured to receive downlink data on one or more unlicensed carriers, i.e. the shared spectrum. This may be UE-specific. That is, a UE with better radio conditions may receive data on more unlicensed carriers.

The eNB 110, upon sending CCA-IDLE, would send a downlink (DL) grant on a licensed DL carrier to its UE. This grant contains a pointer to which unlicensed carrier this grant corresponds to and indicates the locations of the data transmissions.

The UE, upon receiving the DL grant on its licensed DL carrier, would begin decoding the data on its unlicensed frequency channel (if applicable). The UE communicates its Hybrid Automatic Repeat Request-Acknowledgment (HARQ-ACK) for this reception via the licensed UL carrier.

Figure 6:
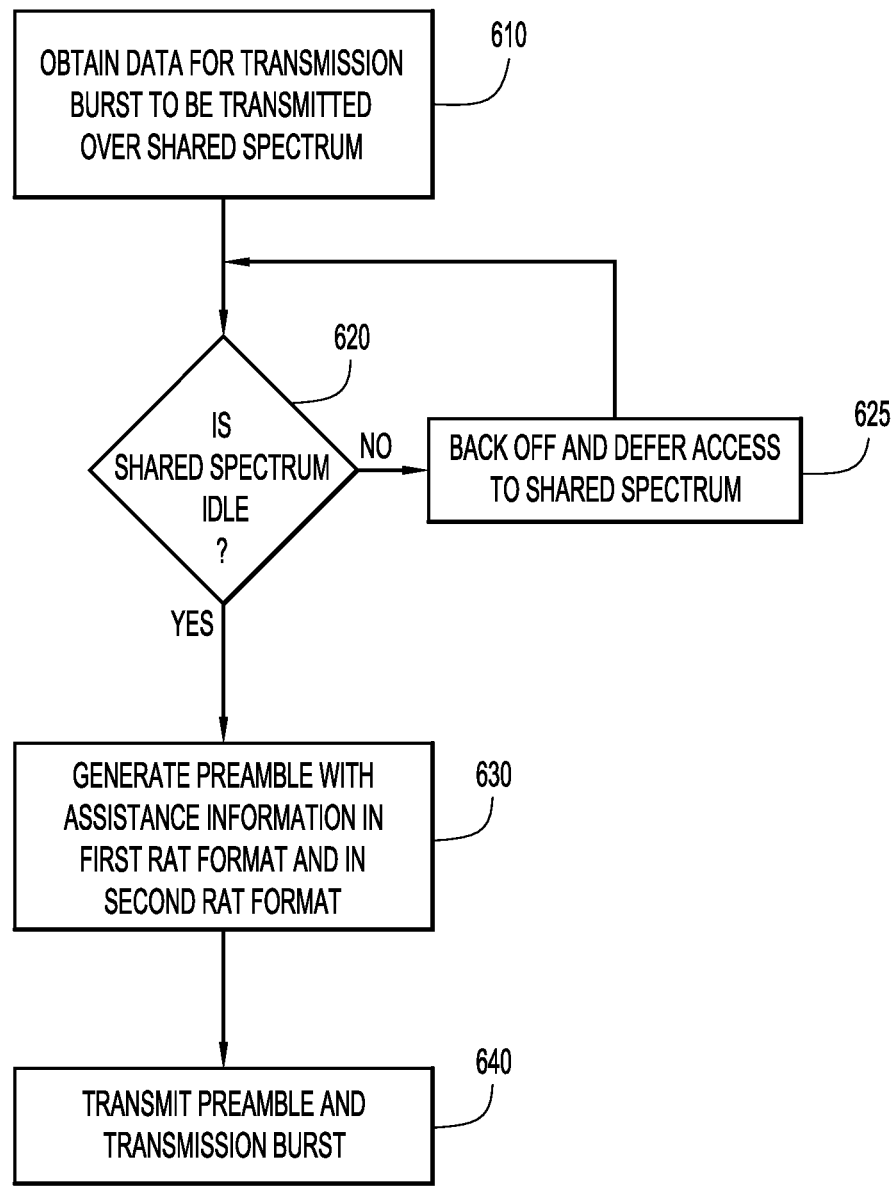
FIG. 6 is a flowchart diagram of the operations performed by a wireless device to minimize interference in a shared spectrum according to an example embodiment.

Referring now to FIG. 6, a flowchart is illustrated of operations performed by a wireless device to minimize interference with other transmitters in a shared spectrum across multiple radio access technologies. In step 610, the wireless device obtains data for a transmission burst that is to be wirelessly transmitted over a shared spectrum. The wireless device uses a clear channel assessment (CCA) to determine whether the shared spectrum is idle in step 620. The CCA may include an energy detection procedure and/or a preamble detection procedure. If the shared spectrum is not idle, then the wireless device defers access to the shared spectrum and performs a backoff procedure in step 625. The backoff procedure may include running a timer for a number of CCA slots selected uniformly randomly based on a truncated exponential backoff mechanism. The random backoff procedure encourages fairness in using the shared spectrum.

If the shared spectrum is idle, then, in step 630, the wireless device generates a preamble with assistance information encoded in different radio access technology (RAT) formats. In one example, the preamble comprises a first portion that is formatted according to a first standard and a second portion that is formatted according to a second standard. The first portion of the preamble may be formatted according to a SAC-LTE standard. The second portion of the preamble may be formatted according to an IEEE 802.11 standard, i.e., Wi-Fi. The assistance information may comprise information to reserve resources on the shared spectrum and ensure that other transmitters do not interfere with the subsequent data transmission. In step 640, the wireless device transmits the preamble followed by the data transmission in a transmission burst opportunity over the shared spectrum.

To summarize, presented herein are methods for a Listen-before-Talk (LBT) scheme for SAC-LTE via a Clear Channel Assessment mechanism. Also presented are methods for generating a preamble signal that is formatted/configured to reserve the medium prior to data transmission and to thereby notify neighboring devices (e.g., SAC-LTE and Wi-Fi devices). This signal contains assistance information for neighbor UE/access points (either SAC-LTE or Wi-Fi) to detect the duration of transmission and its characteristics. Details on how the reference sequence that is used to generate the root sequence prior to generating the preamble signal are presented above. Further, a method is presented by which a UE with data to send can convey to its eNB, via its licensed carrier, information pertaining to uplink transmission following CCA detection that the medium is idle (e.g., no energy is detected on its frequency channel and no preamble has been detected) following LBT.

These methods do not require significant changes to any SAC-LTE standard. The methods can be implemented on top of existing SAC-LTE modem implementations with small-to-moderate changes to the transmission and/or reception chains.

The methods proposed herein can significantly improve performance of both SAC-LTE and Wi-Fi links in unlicensed frequency spectrum since the SAC-LTE devices perform LBT prior to transmission of data. The assistance information provided by SAC-LTE devices can be decoded by neighbor SAC-LTE/Wi-Fi devices to determine how long they defer medium access. This prevents collisions between neighboring SAC-LTE transmitting devices and between SAC-LTE and Wi-Fi transmissions at a SAC-LTE receiver. While SAC-LTE and Wi-Fi are specifically referred to herein in connection with presentation of the interference minimization techniques, this is only by way of example and not meant to be limiting. These techniques may be used in connection with other wireless technologies now known or hereinafter developed.

In one form, a method is provided for minimizing cross-technology interference in a shared spectrum. The method comprises, at a wireless device, obtaining data to be wirelessly transmitted in a transmission burst in a first radio access technology format over a shared spectrum. The wireless device determines whether the shared spectrum is idle using a clear channel assessment (CCA), and generates a preamble comprising assistance information related to the transmission burst. The preamble comprises a first preamble portion in the first radio access technology format and a second preamble portion in a second radio access technology format. Responsive to the CCA determining that the shared spectrum is idle, the wireless device transmits the preamble followed by the transmission burst.

In another form, an apparatus is provided for minimizing cross-technology interference in a shared spectrum. The apparatus comprises a transmitter, a receiver, a modem, and a processor. The transmitter is configured to transmit signals in a shared spectrum in a first radio access technology format and in a second radio access technology format. The receiver is configured to receive signals in the shared spectrum in the first radio access technology format and in the second radio access technology format. The modem is configured to modulate signals and demodulate signals. The processor is configured to obtain data to be wirelessly transmitted in a transmission burst in the first radio access technology format over the shared spectrum. The processor is configured to determine whether the shared spectrum is idle using a clear channel assessment (CCA), and generate a preamble comprising assistance information related to the transmission burst. The preamble comprises a first preamble portion in the first radio access technology format and a second preamble portion in a second radio access technology format. Responsive to the CCA determining that the shared spectrum is idle, the processor is further configured to cause the transmitter to transmit the preamble followed by the transmission burst.

In still another form, one or more non-transitory computer readable storage media are provided. The computer readable storage media is encoded software comprising computer executable instructions and when the software is executed operable to cause a processor to obtain data to be wireless transmitted in a transmission burst in a first radio access technology format over a shared spectrum. The instructions cause the processor to determine whether the shared spectrum is idle using a clear channel assessment (CCA), and generate a preamble comprising assistance information related to the transmission burst. The preamble comprises a first preamble portion in the first radio access technology format and a second preamble portion in a second radio access technology format. Responsive to the CCA determining that the shared spectrum is idle, the instructions further cause the processor to transmit the preamble followed by the transmission burst.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims. In particular, the techniques presented herein and described with respect to LAA-LTE, LAA, or LTE-LAA devices and transmissions may also be used with respect to any type of LTE devices and transmissions that use unlicensed/shared wireless spectrum, and are not intended to be limited to LAA-LTE implementations.

What is claimed is:

1. A method comprising:
at a wireless device, obtaining data to be wirelessly transmitted in a transmission burst using a first radio access technology format over a shared spectrum;
determining whether the shared spectrum is idle using a clear channel assessment over a clear channel assessment time interval; and responsive to the clear channel assessment determining that the shared spectrum is idle:
generating a preamble comprising assistance information related to the transmission burst, the preamble comprising a first preamble portion in the first radio access technology format and a second preamble portion in a second radio access technology format, wherein the preamble includes a number of preamble symbols based on an interval of time between an end of the clear channel assessment time interval and a subframe boundary defined by the first radio access technology format;
transmitting the preamble over a preamble time interval to reserve the shared spectrum, wherein the preamble time interval terminates on the subframe boundary; and
transmitting the transmission burst using the first radio access technology format over the shared spectrum.

2. The method of claim 1, wherein the assistance information comprises an indication of a duration of the transmission burst or an identity of the wireless device.

3. The method of claim 1, wherein the first preamble portion is a Long Term Evolution (LTE) signal on the shared spectrum, and the second preamble portion is an IEEE 802.11 signal on the shared spectrum.

4. The method of claim 1, wherein the clear channel assessment to determine whether the shared spectrum is idle comprises an energy detection procedure or a preamble detection procedure.

5. The method of claim 1, further comprising responsive to the clear channel assessment determining that the shared spectrum is not idle, deferring transmission of the preamble and the transmission burst according to a backoff procedure.

6. The method of claim 5, wherein the backoff procedure comprises:
starting a backoff timer with a length of a number of clear channel assessment slots, the number of clear channel assessment slots being chosen randomly;
deferring transmission of the preamble and transmission burst and monitoring the shared spectrum for activity during each of the clear channel assessment slots while the backoff timer is running;
pausing the backoff timer at a pause value during the clear channel assessment slots in which the shared spectrum is monitored to be busy, and restarting the backoff timer from the pause value when the shared spectrum is monitored to be free; and
transmitting the preamble followed by the transmission burst upon expiry of the backoff timer.

7. The method of claim 1, further comprising transmitting a reservation for the transmission burst in a licensed spectrum.

8. An apparatus comprising:
a transmitter configured to transmit signals in a shared spectrum in a first radio access technology format and in a second radio access technology format;
a receiver configured to receive signals in the shared spectrum in the first radio access technology format and in the second radio access technology format;
a modem configured to modulate signals and demodulate signals;
a processor configured to:
obtain data to be wirelessly transmitted in a transmission burst in the first radio access technology format over the shared spectrum; and
determine whether the shared spectrum is idle using a clear channel assessment over a clear channel assessment time interval;
responsive to the clear channel assessment determining that the shared spectrum is idle:
generate a preamble comprising assistance information related to the transmission burst, the preamble comprising a first preamble portion in the first radio access technology format and a second preamble portion in the second radio access technology format, wherein the preamble includes a number of preamble symbols based on an interval of time between an end of the clear channel assessment time interval and a subframe boundary defined by the first radio access technology format;
cause the transmitter to transmit the preamble over a preamble time interval to reserve the shared spectrum, wherein the preamble time interval terminates on the subframe boundary; and
cause the transmitter to transmit the transmission burst using the first radio access technology format over the shared spectrum.

9. The apparatus of claim 8, wherein the assistance information comprises an indication of a duration of the transmission burst or an identity of the apparatus.

10. The apparatus of claim 8, wherein the first radio access technology format is a Long Term Evolution (LTE) standard, and the second radio access technology format is an IEEE 802.11 standard.

11. The apparatus of claim 8, wherein the clear channel assessment to determine whether the shared spectrum is idle comprises an energy detection procedure or a preamble detection procedure.

12. The apparatus of claim 8, wherein the processor is further configured to, responsive to the clear channel assessment determining that the shared spectrum is not idle, cause the transmitter to defer transmission of the preamble and the transmission burst according to a backoff procedure.

13. The apparatus of claim 12, wherein the processor is configured to execute the backoff procedure by:
starting a backoff timer with a length of a number of clear channel assessment slots, the number of clear channel assessment slots being chosen randomly ;
deferring transmission of the preamble and the transmission burst and, through the receiver, monitoring the shared spectrum for activity during each of the clear channel assessment slots while the backoff timer is running;
pausing the backoff timer at a pause value during the clear channel assessment slots in which the shared spectrum is monitored to be busy, and restarting the backoff timer from the pause value when the shared spectrum is monitored to be free; and
causing the transmitter to transmit the preamble followed by the transmission burst upon expiry of the backoff timer.

14. The apparatus of claim 8, wherein the processor is further configured to cause the transmitter to transmit a reservation for the transmission burst in a licensed spectrum.

15. One or more non-transitory computer readable storage media encoded with software comprising computer executable instructions and when the software is executed operable to cause a processor to:
  obtain data to be wirelessly transmitted in a transmission burst using a first radio access technology format over a shared spectrum;
  determine whether the shared spectrum is idle using a clear channel assessment over a clear channel assessment time interval; and
  responsive to the clear channel assessment determining that the shared spectrum is idle:
    generate a preamble comprising assistance information related to the transmission burst, the preamble comprising a first preamble portion in the first radio access technology format and a second preamble portion in a second radio access technology format, wherein the preamble includes a number of preamble symbols based on an interval of time between an end of the clear channel assessment time interval and a subframe boundary defined by the first radio access technology format;
    transmit the preamble over a preamble time interval to reserve the shared spectrum, wherein the preamble time interval terminates on the subframe boundary; and
    transmit the transmission burst using the first radio access technology format over the shared spectrum.

16. The computer readable storage media of claim 15, wherein the assistance information comprises an indication of a duration of the transmission burst.

17. The computer readable storage media of claim 15, wherein the first radio access technology format is a Long Term Evolution (LTE) standard, and the second radio access technology format is an IEEE 802.11 standard.

18. The computer readable storage media of claim 15, wherein the clear channel assessment to determine whether the shared spectrum is idle comprises an energy detection procedure or a preamble detection procedure.

19. The computer readable storage media of claim 15, further comprising instructions operable to cause the processor to, responsive to the clear channel assessment determining that the shared spectrum is not idle, defer transmission of the preamble and the transmission burst according to a backoff procedure.

20. The computer readable storage media of claim 18, further comprising instructions operable to cause the processor to implement the backoff procedure by:
  starting a backoff timer with a length of a number of clear channel assessment slots, the number of clear channel assessment slots being randomly chosen;
  deferring transmission of the preamble and transmission burst and monitoring the shared spectrum for activity during each of the clear channel assessment slots while the backoff timer is running;
  pausing the backoff timer at a pause value during the clear channel assessment slots in which the shared spectrum is monitored to be busy, and restarting the backoff timer from the pause value when the shared spectrum is monitored to be free; and
  transmitting the preamble followed by the transmission burst upon expiry of the backoff timer.

21. The computer readable storage media of claim 15, further comprising instructions operable to cause the processor to transmit a reservation for the transmission burst in a licensed spectrum.

* * * * *